United States Patent
Shahid

(12) 
(10) Patent No.: US 6,256,448 B1
(45) Date of Patent: Jul. 3, 2001

(54) STACKABLE MULTI-FIBER FERRULE ASSEMBLY METHODS AND TOOLS

(75) Inventor: Muhammed A. Shahid, Snellville, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/262,112

(22) Filed: Mar. 4, 1999

(51) Int. Cl.$^7$ .............................. G02B 6/36; G02B 6/00
(52) U.S. Cl. .............................................. 385/147; 385/83
(58) Field of Search ........................... 385/76, 78, 83, 385/86, 147

(56) References Cited

U.S. PATENT DOCUMENTS

| | | | |
|---|---|---|---|
| 4,973,127 | 11/1990 | Cannon, Jr. et al. | 350/96.22 |
| 5,388,174 | 2/1995 | Roll et al. | 385/80 |
| 5,396,572 | 3/1995 | Bradley et al. | 385/78 |
| 5,481,634 | 1/1996 | Anderson et al. | 385/76 |
| 5,603,870 | 2/1997 | Roll et al. | 264/1.25 |
| 5,613,025 | 3/1997 | Shahid | 385/52 |
| 5,620,634 | * 4/1997 | Shahid | 264/1.25 |
| 5,666,456 | * 9/1997 | Merriken | 385/134 |
| 5,689,599 | 11/1997 | Shahid | 385/83 |
| 5,768,455 | 6/1998 | Konik | 385/86 |
| 5,901,262 | * 5/1999 | Kobayashi et al. | 385/89 |

FOREIGN PATENT DOCUMENTS

| | | |
|---|---|---|
| 0 490 698 A1 | 6/1992 | (EP). |
| 2 219 359 A1 | 6/1989 | (GB). |

OTHER PUBLICATIONS

Roger E. Weiss, *Multifiber–ferrule ribbon cable connector shrinks installation costs*, Oct. 1996 edition of *Lightwave*, Copyright 1996 by Penn Well Publishing Company.

* cited by examiner

Primary Examiner—Frank G. Font
Assistant Examiner—Michael P. Stafira
(74) Attorney, Agent, or Firm—Alston & Bird LLP

(57) ABSTRACT

Methods and tools disclosed herein enable the efficient assembly of a stackable multi-fiber ferrule. The present invention facilitates precisely aligned support members within the stack. In addition, the present invention provides for the consistently high precision repetition of the assembly of stackable multi-fiber ferrules. Thus, stackable multi-fiber ferrules assembled in accordance with the present invention are capable of consistently establishing highly efficient optical connections.

19 Claims, 10 Drawing Sheets

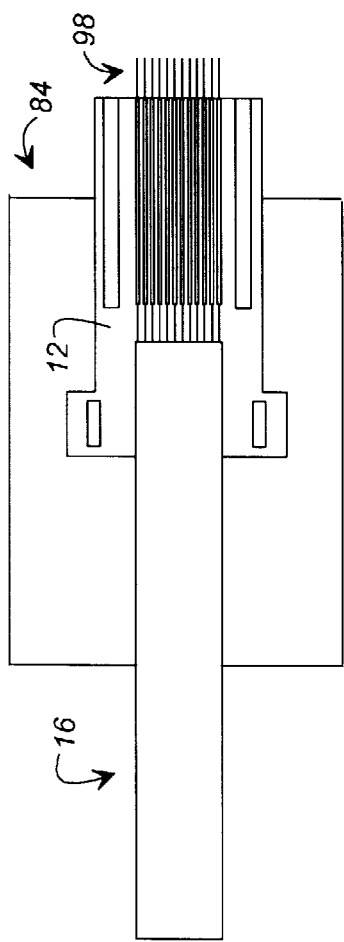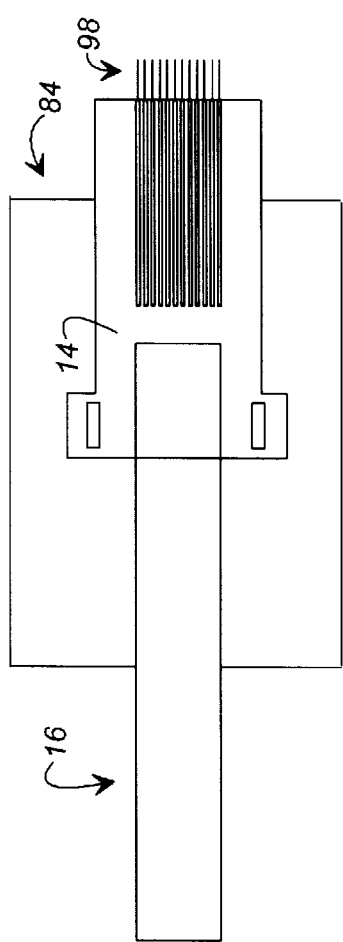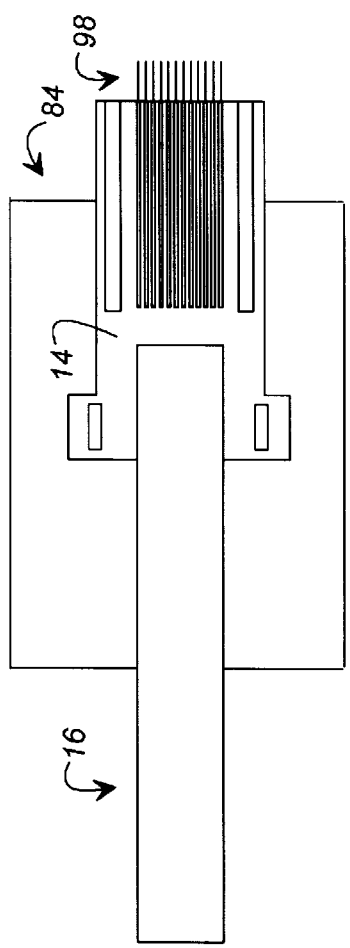

PLACE A TOP OUTER MEMBER IN PLACE OVER THE LAST MULTI-FIBER RIBBON AND INNER MEMBER WITHIN THE ASSEMBLY TOOL — 115

APPLY A PRESSURE CLAMP ON THE FRONT-END OF THE FERRULE STACK, AND REMOVE THE CLAMPED STACK FROM THE ASSEMBLY TOOL — 117

CURE THE EPOXY IN THE STACK UNDER HEAT AND PRESSURE — 119

CLEAVE OFF ANY EXCESS FIBER LENGTH EXTENDING BEYOND THE FRONT END OF THE FERRULE STACK AND POLISH THE FRONT END — 121

END

*FIG. 9B*

STACKABLE MULTI-FIBER FERRULE ASSEMBLY METHODS AND TOOLS

FIELD OF THE INVENTION

The present invention generally relates to optical fiber connectors, more particularly, to stackable ferrules for terminating optical fiber ribbons.

BACKGROUND OF THE INVENTION

Advances in lightwave technology have made optical fiber a very popular medium for large bandwidth applications. In particular, optical technology is being utilized more and more in broadband systems wherein communications between systems take place on high-speed optical channels. As this trend continues to gain more and more momentum, the need for efficient utilization of the precious real estate on circuit boards, racks/shelves, back planes, distribution cabinets, etc., is becoming ever increasingly important. In order to fulfill expectations across the industry, opto-electronic modules and optic fiber devices need to continue to become miniaturized, thereby taking fill advantage of the maturity of micro- and opto-electronic technologies for generating, transporting, managing and delivering broadband services to the ever increasing bandwidth demands of end users at increasingly lower costs. Thus, the industry has placed an emphasis on small form factor optical connectors, such as the LC connector from Lucent Technologies, Inc. However, miniaturization is tempered by the requirements of transmission efficiency. For instance, with the advent of new standards such as gigabit ethernet, wherein the transmission efficiency is becoming more and more critical, the performance of optical connectors is becoming correspondingly important for healthy operation of the system. Thus, it is desirable to obtain component miniaturization without sacrificing transmission efficiency, and sometimes while improving transmission efficiency.

With the miniaturization of optical modules and optical fiber devices, the management of optical fiber congestion has become an issue at optical interfaces and connection distribution points. One solution is the use of multi-fiber ribbon in which a plurality of optical fibers are organized and molded side by side in a plastic ribbon. It is known to interconnect these ribbon cables by supporting the fibers between two support members made of a monocrystalline material, such as silicon. In the support members are V-grooves formed utilizing photolithographic masking and etching techniques. The fibers are placed side by side in individual V-grooves of one support member and the other mating support member having corresponding V-grooves is placed over the fibers so as to bind or hold the fibers in a high precision, spatial relationship between the mating V-grooves. The top and bottom support members sandwiching the multi-fiber ribbon are typically bonded together with a clamp or adhesive, forming a ferrule of a multi-fiber connector. Two mating ferrules with the same fiber spacing may then be placed in an abutting relationship so that the ends of the fibers of the respective ferrules are substantially co-axially aligned with one another, thereby forming a multi-fiber connection. If desired, such ferrules can be stacked in order to increase the interconnection density.

Multi-fiber ribbons and connectors have numerous applications in optic communication systems. For instance, some opto-electronic and optical application specific integrated circuits (OASIC) devices, e.g, optical switches, optical power splitters/combiners, routers, etc., have several input and/or output ports arranged as linear arrays to which a plurality of fiber are to be coupled. Further, since optical fibers are attached somehow to launch optical signals into these devices and extract optical signals out of these devices, splicing of arrays of fibers (i.e., a multi-fiber ribbon) to such devices can be achieved using multi-fiber connectors. Yet another possible application relates to an optical fan-out fabric where an array of fibers in a multi-fiber ribbon may be broken into simplex or duplex channels for distribution purposes, as is often desired.

A critical factor to the optical efficiency of a multi-fiber ferrule, whether or not stacked, is the alignment of the mating ferrules with regard to one another. To that end, alignment pins are often utilized. Alignment pins are received in alignment pin holes or slots in the respective ferrules so as to hold the ferrules in precise alignment with regard to one another. The alignment pins usually extend parallel to the optical fibers, and are preferably made of a material have a similar coefficient of thermal expansion to the ferrules. In one embodiment, as disclosed in U.S. Pat. No. 4,973,127 to Cannon Jr. et al., alignment pin holes are formed by grooves that are laterally disposed on opposite sides of the optical fiber V-grooves in the support members, such that when two support members are brought together, alignment pin holes are defined by mating alignment grooves. In U.S. Pat. No. 5,620,634 to the present inventor, wherein support members are stacked in order to increase the interconnection density, alignment slots are provided on each row of optical fiber, that is, every support member interface.

A critical factor to the success of any multi-fiber interconnection system is the ease and speed at which it can be assembled. It is desirable that a ferrule stack be assembled relatively quickly with a minimum amount of effort and overhead so that such connection systems can be manufactured economically. Connection systems which call for elaborate and costly procedures for assembly are not likely to be commercially successful because the cost of manufacturing drives up the price above market.

In summary, there continues to be strong market forces driving the miniaturization of fiber optic connection systems, while at the same time demanding that the increasing interconnection density requirements be satisfied. Further, such a connection system should be capable of being manufactured and assembled easily and inexpensively.

SUMMARY OF THE INVENTION

The present invention comprises methods and tools that enable the efficient assembly of a stackable multi-fiber ferrule. The present invention facilitates the precise alignment of support members within a stackable multi-fiber ferrule. In addition, the present invention provides for the consistently high precision repetition of the assembly of stackable multi-fiber ferrules, and thereby enables the production of consistently highly efficient optical connections.

In accordance with an aspect of the present invention, a method for assembling a stackable multi-fiber ferrule utilizing an assembly tool having a slot configured to receive a plurality of v-groove support members therein comprises placing a first v-groove support member in the slot of the assembly tool, placing a first stripped multi-fiber ribbon on the first support member so that the individual fibers of the ribbon overlay respective v-grooves of the first support member, applying an adhesive on the first multi-fiber ribbon, and placing a second support member over the first support member within the slot of the assembly tool so as to sandwich the first multi-fiber ribbon, wherein the individual fibers of the multi-fiber ribbon are held between respective v-grooves of the first and second support members, thereby forming a ferrule stack. The method can further comprise the steps of placing a second stripped multi-fiber ribbon on the second support member so that the individual fibers of the ribbon overlay respective v-grooves of the second support member, applying an adhesive on the second multi-fiber ribbon, and placing a third support member over the second support member within the slot of the assembly tool so as to sandwich the second multi-fiber ribbon, wherein the individual fibers of the second stripped multi-fiber ribbon are held between respective v-grooves of the second and third support members. Further steps may include applying an adhesive on the second multi-fiber ribbon, and placing an outer support member over the first inner support member within the slot of the assembly tool so as to sandwich the first multi-fiber ribbon, wherein the individual fibers of the multi-fiber ribbon are held between respective v-grooves of the second and third support members.

The method may further comprise applying compressive pressure to the ferrule stack, and applying heat to cure the adhesive. In addition, the method can comprise the step of cleaving off any excess length of the individual fibers extending past a front-end of the ferrule stack.

In accordance with another aspect of the present invention, an assembly tool for assembling a stackable multi-fiber ferrule which holds N multi-fiber ribbons between N+1 support members comprises a support body defining a slot, wherein the slot includes a ribbon cavity having a width approximating that of the multi-fiber ribbon and a support member cavity having a profile approximating that of a support member. The assembly tool can comprise a material selected from a group consisting of ceramic, steel, aluminum and plastic. The support member cavity is sized so that a front-end of a support member extends outside the support member cavity.

In accordance with yet another aspect of the present invention, a method for assembling a stackable multi-fiber ferrule utilizing an assembly tool having a slot configured to receive a plurality of v-groove support members therein comprises fabricating a plurality of support members, providing an assembly tool, stacking the outer support members and inner support members within the assembly tool which holds the outer and inner support members in registry with one another, wherein multi-fiber ribbons are interposed between adjacent support members, thereby forming a stack, and applying a compressive force to the stack. The step of applying compressive force can comprise applying compressive force while the stack is positioned in the assembly tool. The adhesive can be cured by heating the ferrule. The step of fabricating one support member can include the step of injection molding the support members which, in turn, can comprise providing an injection mold fabricated from a monocrystalline master mold form.

Other features and advantages of the present invention will become apparent to one skilled in the art upon examination of the following drawings and detailed description. It is intended that all such features and advantages be included herein within the scope of the present invention as defined by the appended claims.

BRIEF DESCRIPTION OF THE DRAWINGS

FIGS. 8A–8G are top plan views at incremental steps of assembling a stackable multi-fiber ferrule using the assembly tool of FIGS. 6A-6B in accordance with an embodiment of the present invention.

FIGS. 9A–9B are flowcharts of the assembly of a stackable multi-fiber ferrule using the assembly tool of FIGS. 6A–6B, as depicted in FIGS. 8A–8G, in accordance with an embodiment of the present invention.

DETAILED DESCRIPTION OF THE INVENTION

Figure 1:
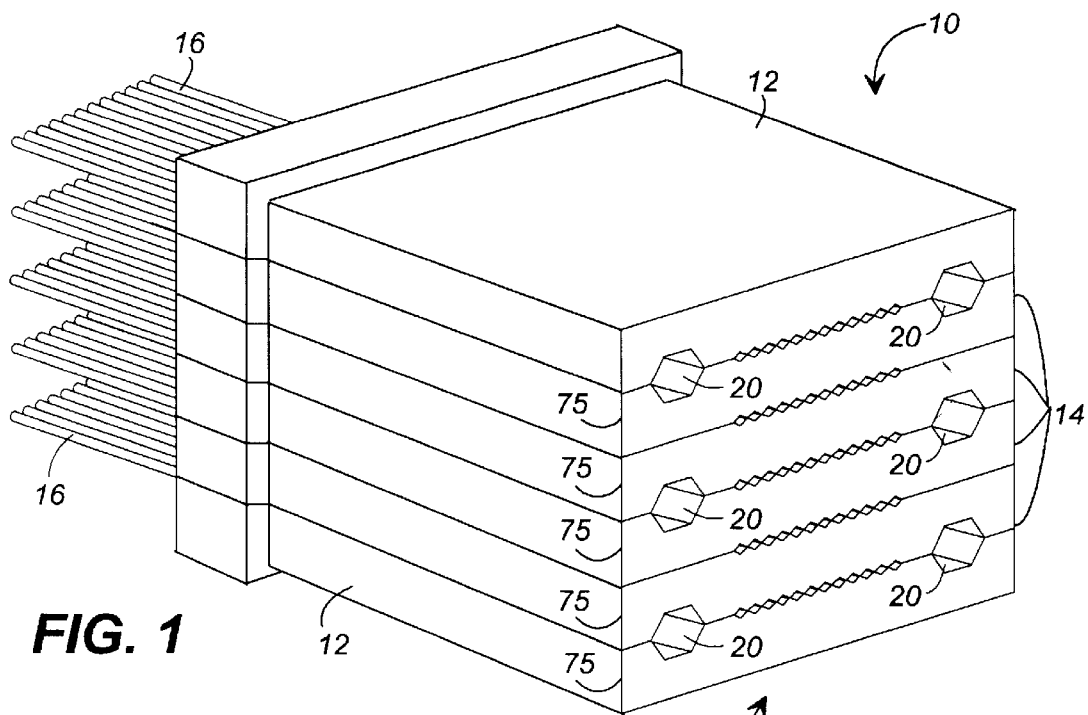
FIG. 1 is a perspective view of a multi-fiber stackable ferrule in accordance with one embodiment of the present invention.

The present invention will now be described more fully hereinafter with reference to the accompanied drawings, which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like reference numeral refer to like elements throughout. Furthermore, the elements of the drawings are not necessarily to scale, emphasis instead being placed upon illustrating the principles of the present invention.

With reference to FIG. 1, a multi-fiber stackable ferrule 10 in accordance with an embodiment of the present invention is illustrated. The ferrule 10 comprises two outer support members 12 that sandwich substantially identical inner support members 14. For purposes of illustrating the present invention, the embodiment chosen terminates five multi-fiber ribbons 16, though upon reading the disclosure herein, it will be apparent to one of ordinary skill in the art that the present invention may be utilized to terminate any number of multi-fiber ribbons 16. The support members 12, 14 include parallel V-grooves which hold the fibers of the respective multi-fiber ribbons 16 in precise, spaced alignment with respect to one another as the V-grooves of adjacent support members are laid over one another in a mating relationship. Thus, the individual fibers of the multifiber ribbons 16 are substantially flush to the front-end face 18 of ferrule 10 so that the fibers may be optically coupled to another ferrule or device.

In accordance with one aspect of the present invention, alignment pin holes 20 formed by alignment pin grooves in the support members 12, 14 are provided for on every other row of optical fibers, that is, at alternate interfaces of the respective adjacent support members. In particular, the alignment pin grooves of the inner support members 14 are not opposing one another on opposite sides of the inner support member. In the embodiment illustrated, alignment pin grooves are provided in only one surface, though it will be appreciated by those of ordinary skill in the art that alternative designs may be utilized, such as where the alignment pin grooves are diagonal to one another on opposite surfaces. Thus, the inner support members 14 do not have to be thick enough to accommodate two opposing alignment pin grooves, and therefore, can be made thinner than conventional inner support members. Accordingly, the overall height or thickness of the ferrule 10 may be advantageously reduced, and the overall interconnection density increased.

Figure 2A:
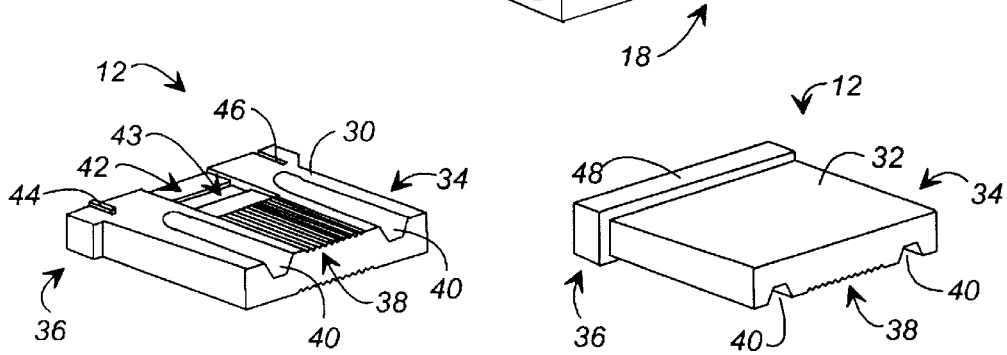
FIG. 2A is a top perspective view of an outer support member in accordance with one embodiment of the present invention.
Figure 2B:
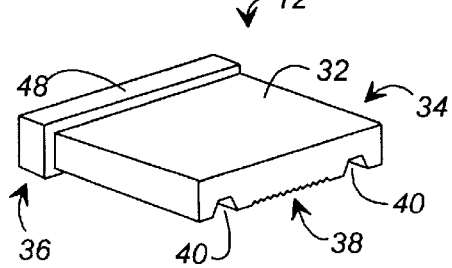
FIG. 2B is a bottom perspective view of the outer support member of FIG. 2A.

With reference to FIGS. 2A and 2B, the inside surface 30 and outside surface 32 of the outer support member 12 are illustrated, respectively. The outer support member 12 includes a front portion 34 and a rear portion 36. An array of parallel V-grooves 38 for receiving and holding the optical fibers of the multi-fiber ribbon 16 in precise alignment with respect to one another are provided in the front portion 34 of the inside surface 30. In addition, the inside surface 30 includes relatively deeper V-grooves, referred to hereinafter as alignment pin V-grooves 40, which are laterally disposed on either side of V-grooves 38 and are sized and shaped for holding alignment pins. While the alignment pin V-grooves 40 extend from the front portion 34 toward the rear portion 36, it is recognized that the V-grooves 40 may be sized to extend from the front portion 34 to the rear portion 36, essentially extending from one edge to an opposite edge of inside surface 30. The lateral space between the V-grooves 38, 40 may be defined in accordance with an optical fiber connector interface standard, if desired. Further, while twelve V-grooves 38 are provided by outer support member 12, it will be appreciated by those of ordinary skill in the art that more or fewer than twelve may be utilized without departing from the present invention. For example, it may be desirable to merely have two V-grooves 38 in a duplex system, or up to 32 V-grooves in other systems.

The rear portion 36 includes a ribbon recess 42 which holds a multi-fiber ribbon 16 at or about the point at which the individual optical fibers of the ribbon are separated and stripped. The ribbon recess also provides space for the adhesive utilized to bond adjacent support members together, as discussed below. Further, ribbon recess 42 includes a strain relief element recess 43 for receiving and engaging a lip or other retaining structure at the end of an external strain relief element associated with a multi-fiber ribbon.

A retaining pin 44 and a retaining slot 46 are provided on either side of the cable recess 42 for proximately aligning and holding adjacent support members. The retaining pin 44 and slot 46 provide for the lateral alignment of adjacent support members so that corresponding arrays of V-grooves align with one another. The mating V-grooves can be fabricated with such precision, as discussed hereinafter, that the V-grooves themselves precisely align the individual fibers. This is inherent in the V-shaped design which has an acceptance region at the open end or top of each V-groove for receiving an individual optical fiber which is held in a precise predetermined alignment by the sides of the V-groove. The precise alignment of adjacent support members ensures that the mating V-grooves of adjacent support members are in registration with one another. A ridge 48 at the rear portion 36 is provided to register an end-stop in an housing (not shown) in which such ferrules are utilized, as well known in the art.

Figure 2C:
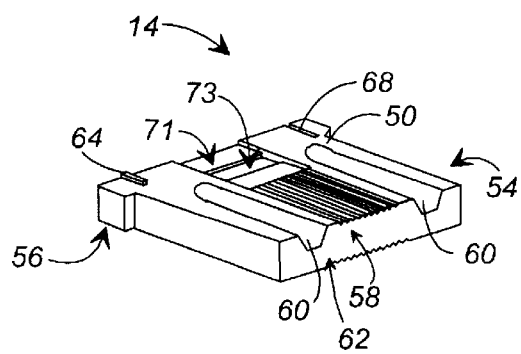
FIG. 2C is a top perspective view of an inner support member in accordance within embodiment of the present invention.
Figure 2D:
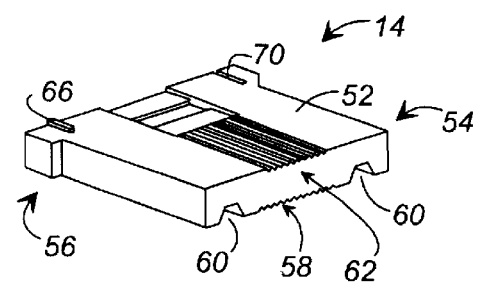
FIG. 2D is a bottom perspective view of the inner support member of FIG. 2C.

With reference to FIGS. 2C and 2D, opposing first and second surfaces 50, 52 of the inner support member 14 are illustrated. The inner support member 12 includes a front portion 54 and a rear portion 56. A first array of parallel V-grooves 58 are provided in a first surface 50 of the front portion 56 for receiving and holding optical fibers of the multi-fiber ribbon 16, and relatively deeper alignment pin grooves 60 laterally disposed on either side of the first array of V-grooves 58. In addition, the second surface 52 of the inner support member 14 includes a second array of parallel V-grooves 62. Thus, the inner support member 14 includes substantially identical and aligned arrays of V-grooves 58, 62 on opposite surfaces for mating with corresponding arrays of V-grooves formed in adjacent support members. In addition, retaining pins 64, 66 and retaining slots 68, 70 are provided on opposing surfaces 50, 52 at the rear portion 58 of the inner support member 14 for aligning and holding adjacent support members, as discussed above with respect to the outer support member 12. Yet further, a ribbon recess 71 and a strain relief element recess 73 are provided in both surfaces 50, 52, as also discussed above with respect to the outer support member 12.

In accordance with the present invention, the inner support member 14 does not include opposing alignment pin grooves in opposite surfaces. Specifically, with reference to the embodiment illustrated in FIGS. 2C and 2D, the second surface 52 does not include alignment pin V-grooves. It is noted, however, that the second surface may include alignment pin grooves which are staggered (ie., offset) with respect to the corresponding alignment pin grooves 60 in the first surface 50 in the alternative. However, if staggered alignment pin grooves are utilized, then the lateral space on either side of the arrays of V-grooves may have to be increased, which may not be acceptable in certain applications. Thus, whether one surface does not include alignment pin grooves or staggered alignment pin grooves on opposite surfaces, the thickness of the inner support member may be less than that of conventional support members since the support member does not have to be thick enough to accommodate opposing alignment pin grooves. For example, with reference to FIG. 3, the thickness 72 of an inner support member is approximately 740 microns in the preferred embodiment, whereas conventional support members are often 2500 microns thick. Accordingly, by reducing the thickness of the inner support member, more multi-fiber ribbons can be terminated with a ferrule of the same size, thereby enabling the increase of interconnection density.

In addition, it is preferred that the thickness 72 of the inner support members should be such that the distance 74 between the centers of adjacent V-grooves within an array is a whole number multiple of the distance 76 between the center of the V-grooves at one interface and the centers of the V-grooves at an adjacent interface, or vice versa. Accordingly, the thickness 72 is approximately 740 microns and the spacing at the interfaces 75 between adjacent support members is approximately 10 microns, thereby resulting in a distance 76 that is approximately 750 microns, which is a multiple of an illustrative fiber to fiber distance 74 of 250 microns. The approximate distance of 10 microns between adjacent support members is by design so that when two mating support members are placed about a multi-fiber ribbon, the fiber will be under compression. This ensures that fibers with nominal variances in their outside diameters are precisely aligned between mating V-grooves. The controlling V-groove is preferably controlled by an applicable interconnection interface standard. For purposes of this disclosure, the center of a V-groove is the center of an optical fiber held in the V-groove. Thus, greater flexibility with regard to whether the interface planes of a stackable ferrule are parallel or perpendicular to the interfaces of a connecting ferrule.

Figure 3:
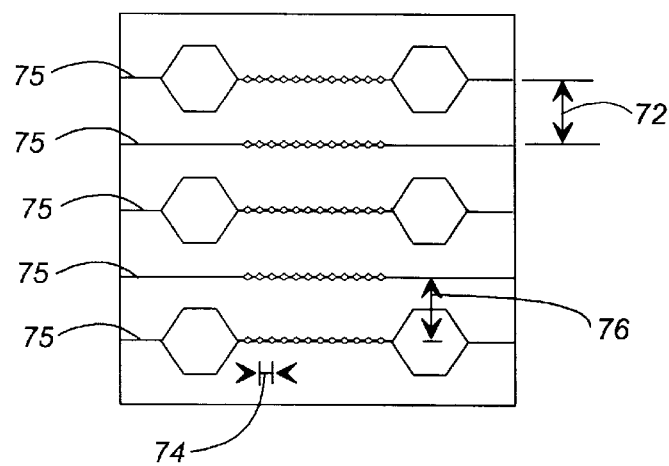
FIG. 3 is a front plan view of the multi-fiber stackable ferrule of FIG. 1.

Thus, by flipping the face-down side of each successive inner support member 14 added to a ferrule stack, the alignment pin holes 20 formed by the alignment pin grooves are positioned at alternating interfaces 75, also referred to as rows of optical fibers, as illustrated in FIGS. 1 and 3. In order to adequately align and secure the ferrule 10 from moving with respect to another ferrule to which it is being optically coupled, there should be at least two alignment pins. While the present invention does not necessarily provide for two alignment holes on every row of optical fibers, it does provide a more than adequate precision and rigidity for most applications, while permitting the overall thickness of the stack of ferrules to be reduced relative to conventional designs.

Accordingly, a ferrule 10 in accordance with the present invention may terminate a theoretically infinite number of multi-fiber ribbons by the present invention utilizing two outer support members 12 and an appropriate number of inner support members 14. As only the two structural components are necessary, the overall costs of a stackable multi-fiber ferrule in accordance with the present invention can be less than that of comparable stackable ferrules that require more than two components. This is, at least in part, because the support members can be fabricated using plastic injection molding techniques with only two molds: one for the outer support member 12 and one for the inner support member 14. This further increases the precision of the V-grooves because adjacent parts will often be formed from the same mold.

In particular, the support members 12, 14 are preferably fabricated using the techniques described in U.S. Pat. Nos. 5,388,174; 5,620,634 and 5,603,870, the disclosures of which are incorporated here by reference as if set forth in full. This process has been proven to consistently and reliably produce features with accuracy on the order of 1 $\mu$m or better. Generally, this process is as follows. Initially, a monocrystalline body, such as a silicon chip, is anisotropically etched using conventional masking and etching techniques to produce V-grooves. For example, either KOH/water or EDP/water solutions may be used as an etchant. The etch rate of the silicon may be several orders of magnitude greater than that of the mask layer such that the unmasked portions are etched away when exposed to the etchant solution, thereby defining the V-grooves along the {111} crystal planes of the silicon. By precisely controlling the mask pattern and the etching process, precise V-grooves of predetermined spacing, widths, and depths may be fabricated in the silicon wafer. It is noted that the V-grooves do not have to be exactly V-shaped. For example, since the optical fibers and alignment pins are essentially round in cross-section, the bottom of the V may be truncated in the same fashion as the alignment pin grooves 40, 60. If truncated, the grooves 40, 60 should be deep enough to provide adequate clearance for an alignment pin. Past that depth, the bottom of the groove is essentially non-functional. However, the depth of the groove may be limited by the necessary structural strength required of the support member, and in particular, the portion of the support member defining the alignment pin groove.

To allow for shrinkage of the plastic during the subsequent molding process, the features on the silicone chip, such as the V-grooves and their spacing, should be made somewhat larger than is finally intended for the final support member. A thin metal layer is then electro-formed over the V-grooves; thereafter, the silicon body is removed or destroyed, as by etching it in, for example, a mixture of HF, $HNO_3$ and water, or KOH and water (or other known etchants of silicon) suitable for use herein. In the preferred embodiment, the metal layer is formed by electroplating nickel over the silicon wafer. Nickel is preferred because it can be conveniently electro-formed with reasonable hardness (e.g., ~50 Rockwell). The electro-formed metal layer forms an inverse replica of the silicon wafer chip which is machined for used as an insert in an injection mold for defining the V-grooves, as well as other features, of the support members 12, 14.

Experiments are then conducted with the injection mold to optimize molding conditions. This involves selection of the most suitable molding compound, molding parameters that produce a smooth surface morphology, and most importantly the degree of mold shrinkage. Such experiments help determine the operation parameters for the optimal output. Preferred material for forming the support members is polyphenylene sulfide (PPS), which has a shrinkage of ~0.4% below the dimensions of the original silicon master. Consequently, the dimensions of the silicon master should be ~0.4% greater than the final desired dimensions. For bonding the support members 12, 14 together, any of various optical adhesives can be used, such as Epo-Tek 353ND, which is commercially available from Epoxy Technologies, Inc., Billerica, Mass.

Figure 4A:
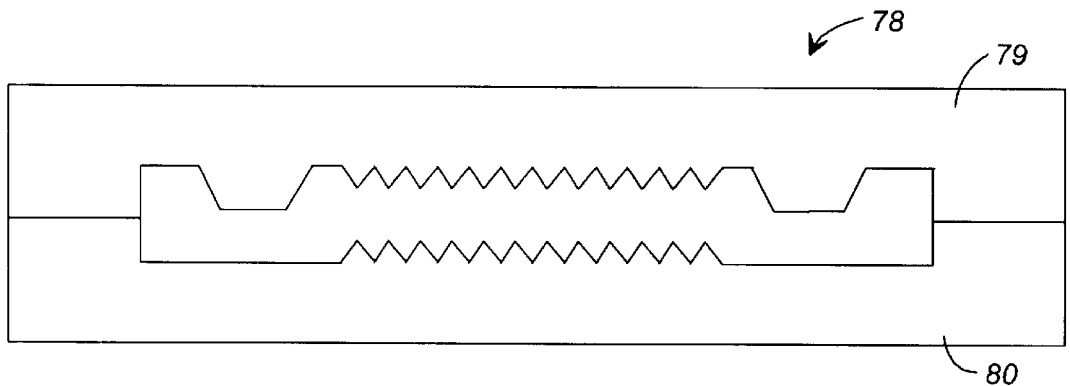
FIGS. 4A–4B are cross-sectional views of a mold utilized for fabricating inner and outer support members of the of the stackable multi-fiber ferrule of FIG. 1.
Figure 4B:
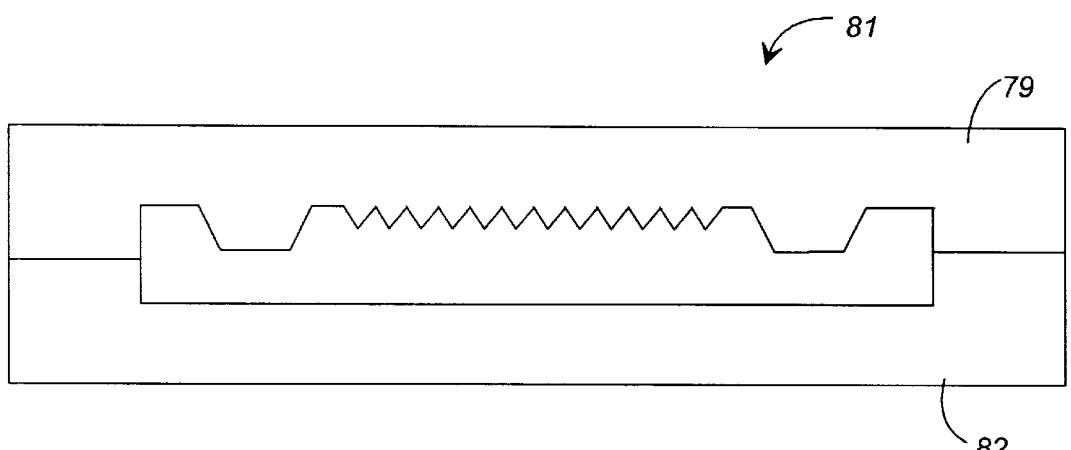

Using an injection mold 78, as depicted in FIG. 4A, an inner support member 14 in accordance with an embodiment of the present invention can be formed. The injection mold 78 includes a first part 79 for forming the features of the first surface 50 and a second part 80 for forming the features of the second surface 52. It is noted that the corresponding V-grooves of the first part 79 and the second part 80 are precisely aligned with one another. Likewise, an injection mold 81, as depicted in FIG. 4B, may be utilized to form the outer support member 12. The injection mold 78 includes the first part 79 for forming the features of the inside surface 30 and a third part 82 for forming the features of the outside surface 32. Accordingly, support members 12, 14 can be formed sharing mold part 79, thereby comprising a three-part mold construction. By only requiring three parts to mold the inner and outer support members 12, 14, the cost of manufacturing and the resulting precision of the molded parts may be increased. Preferably, experiments are initially conducted to optimize molding conditions. This involves selection of the most suitable molding compound, molding parameters that produce and smooth surface morphology, and most importantly the value of mold shrinkage. Such experiments help determine the operation parameters for the optimal output.

Figure 5:
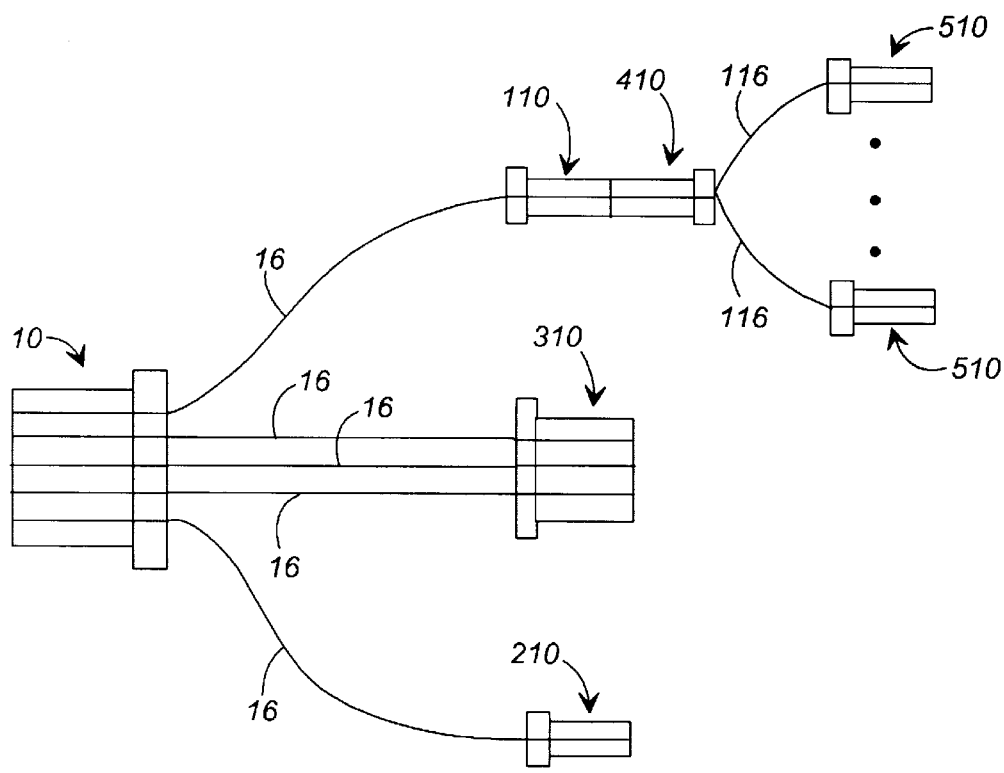
FIG. 5 is a schematic diagram illustrating the fan-out of multi-fiber ribbon and individual fibers utilizing a stackable multi-fiber ferrule in accordance with an embodiment of the present invention.

With reference to FIG. 5, an exemplary application is provided for a stackable multi-fiber ferrule 10 in accordance with an embodiment of the present invention at a distribution point in which the multi-fiber ribbons 16 terminate at the ferrule 10 and fan-out into two single ribbon ferrules 110, 210 and a three ribbon ferrule 310. The fiber terminations may be coupled to independent optical circuits, to a single broad optical source that illuminates all the fibers, or may be selectively tapped off as in a switch or distribution point. Further, the one ribbon ferrule 110 can be mated to another one ribbon ferrule 410, which may itself terminate one or more individual optical fibers 116. The optical fiber(s) 116 may then fan-out to a plurality of single or multi-fiber ferrules 510. Thus, the optical fiber(s) 116 may be a single optical fiber or multiples thereof. However, this is merely one illustrative embodiment which shows several of the possible fan-out combinations which may be efficiently achieved by a stackable ferrule in with the present invention.

In yet another application, because of the increased connection density and precise fiber alignment of a stackable multi-fiber ferrule assembled in accordance with an embodiment of the present invention, the stackable multi-fiber ferrule may be suitable for mounting at its face-end to an array of precisely aligned surface emitting/receiving devices such as surface emitting lasers (SEL) or other discrete components that can be fabricated with precise spacing on a circuit board or substrate. The optical fibers terminating with the stackable multi-fiber ferrule can be coupled to the surface device whereby a single component is placed in a butting relationship with each optical fiber. Thus, a low profile device connection can be achieved.

Figure 6A:
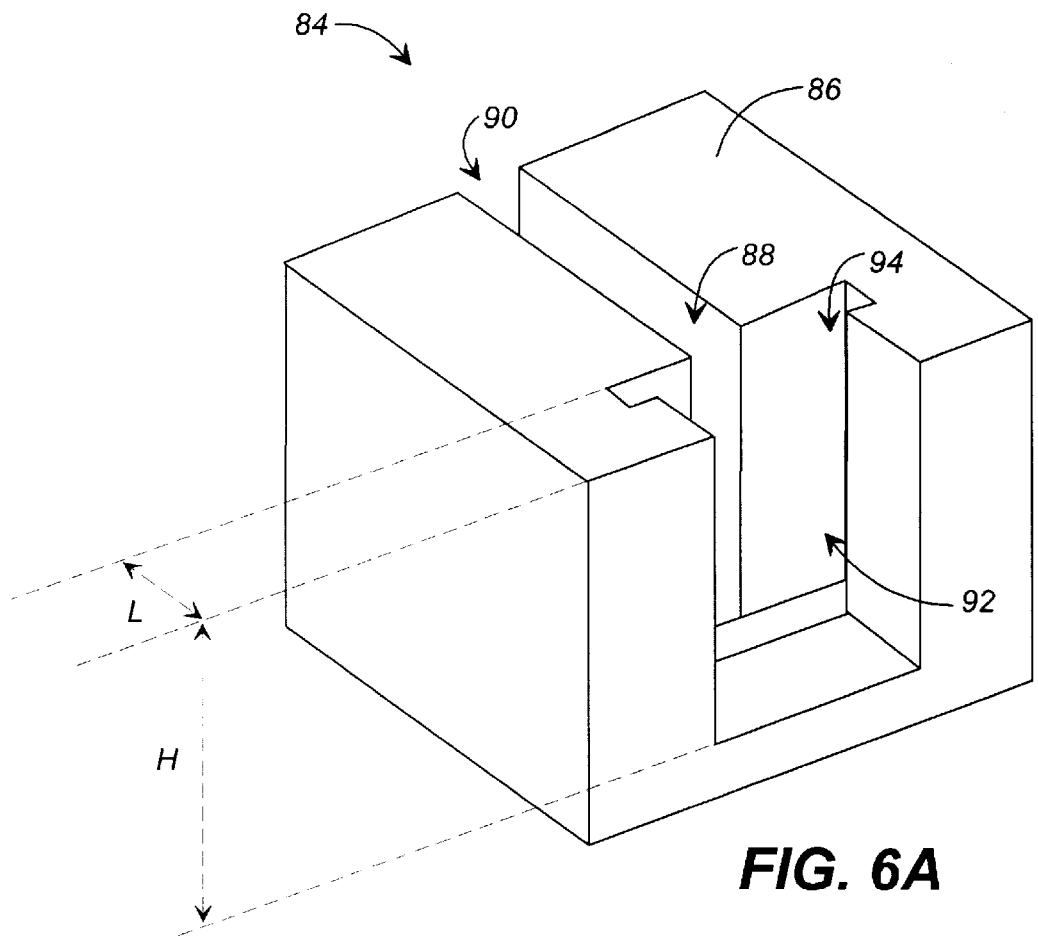
FIG. 6A is a perspective view of a stackable multi-fiber ferrule assembly tool in accordance with an embodiment of the present invention.
Figure 6B:
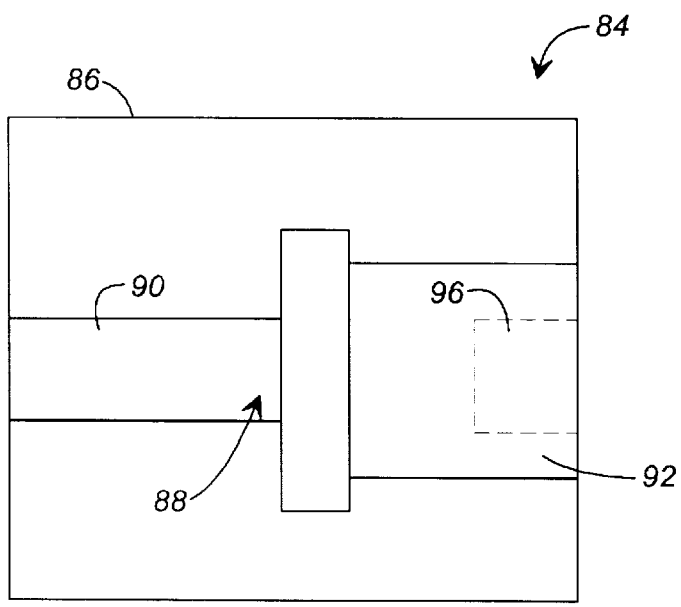
FIG. 6B is a top plan view of a stackable multi-fiber ferrule assembly tool of FIG. 6A.

With reference now to FIGS. 6A–6B, an assembly tool 84 in accordance with an embodiment of the present invention is illustrated. The assembly tool is sized and shaped to receive two or more support members 12, 14 with precise alignment for assembling a multi-fiber stack, as illustrated in FIG. 1. The assembly tool 84 comprises a support body 86 which for purposes of the present embodiment is substantially rectangular. The support body 86 defines a slot 88 having a ribbon cavity 90 and a support member cavity 92. The support cavity 92 has a widened width portion 94 for receiving the rear portions 36, 56 of the support members 12, 14, respectively and a non-widened width portion 95 for receiving the front portions of the support members.

Figure 7:
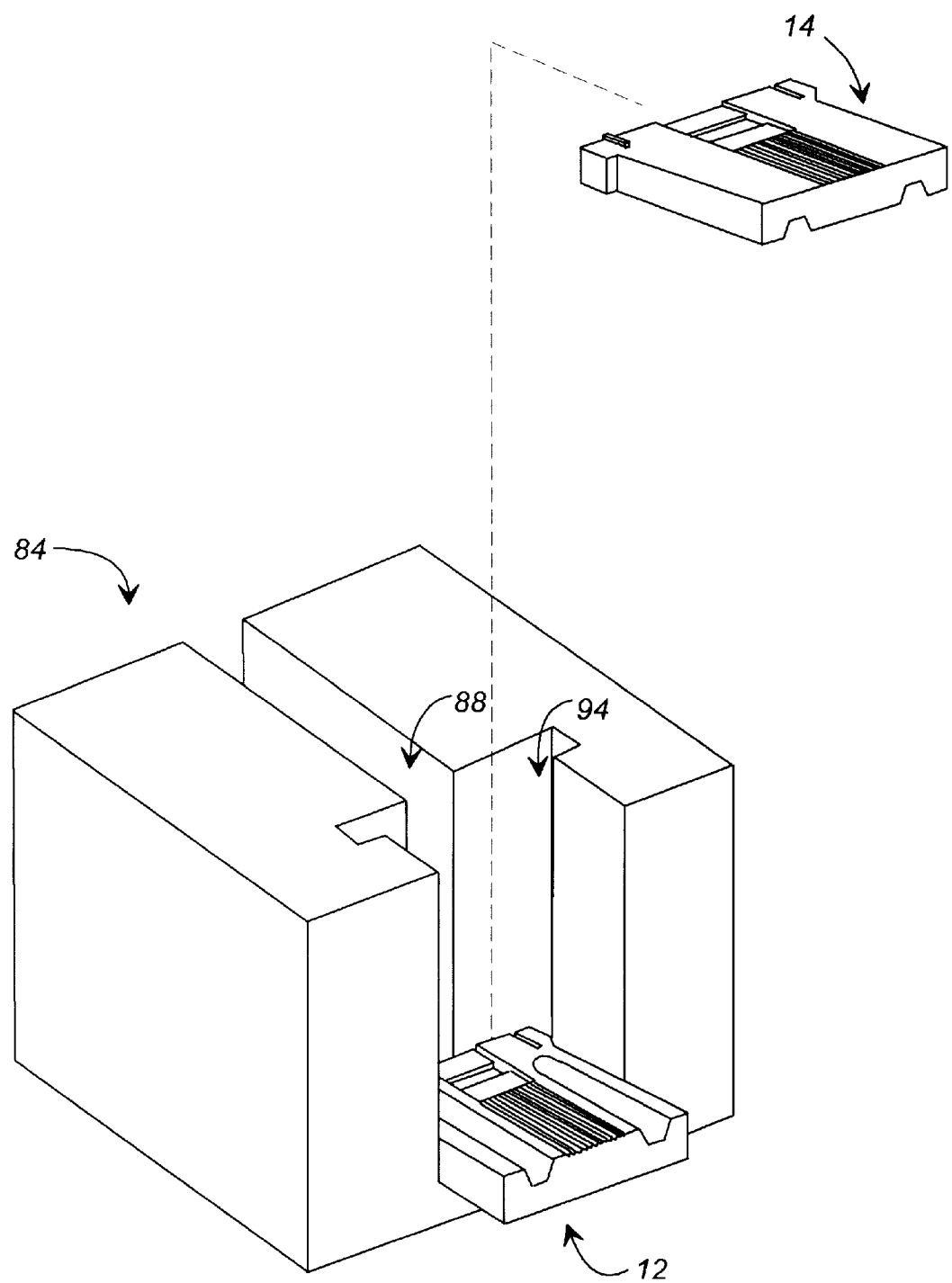
FIG. 7 is a prospective view illustrating support members being loaded into the assembly tool of FIGS. 6A and 6B.

The assembly tool is preferably machined out of a metallic material such as steel or aluminum, though it will be recognized that there are numerous suitable materials and methods for fabricating the assembly tool, such as cast metal, machined metal, or molded plastic. The height H of the slot 88 can be designed to accommodate a predetermined number of support members. The length L of the support member cavity 92 is preferably designed to be less than the corresponding length of the support members 12, 14 so that a portion of the front portions 34, 546 extend outside the support member cavity 92, as illustrated in at least FIG. 7. Thus, support members 12, 14 may be positioned in the assembly tool 84 with high precision with respect to one another, as shown in FIG. 7. It is further noted, however, that the length L of the support cavity 92 may be greater than the corresponding length of the support members 12, 14 if desired, though in such cases it is preferred that a longitudinal section of the lower portion of the support cavity 94 be cut out such as that defined by phantom lines 96 of FIG. 6B, so that a clamping or compression device can be placed about the front portion of the stackable multi-fiber ferrule, at the front-end face 18, as discussed below.

Figures 8A, 8B:
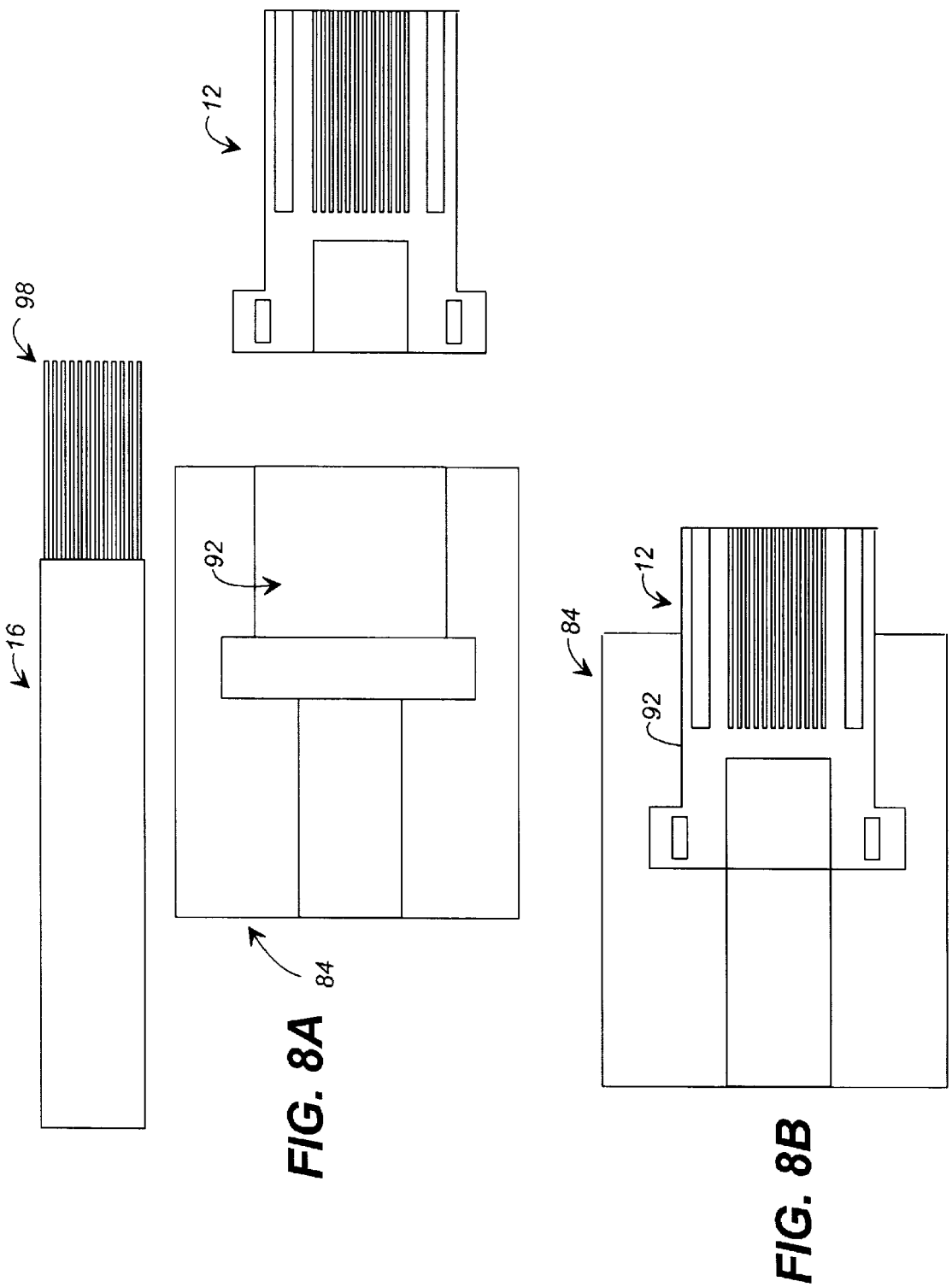
Figure 8F:
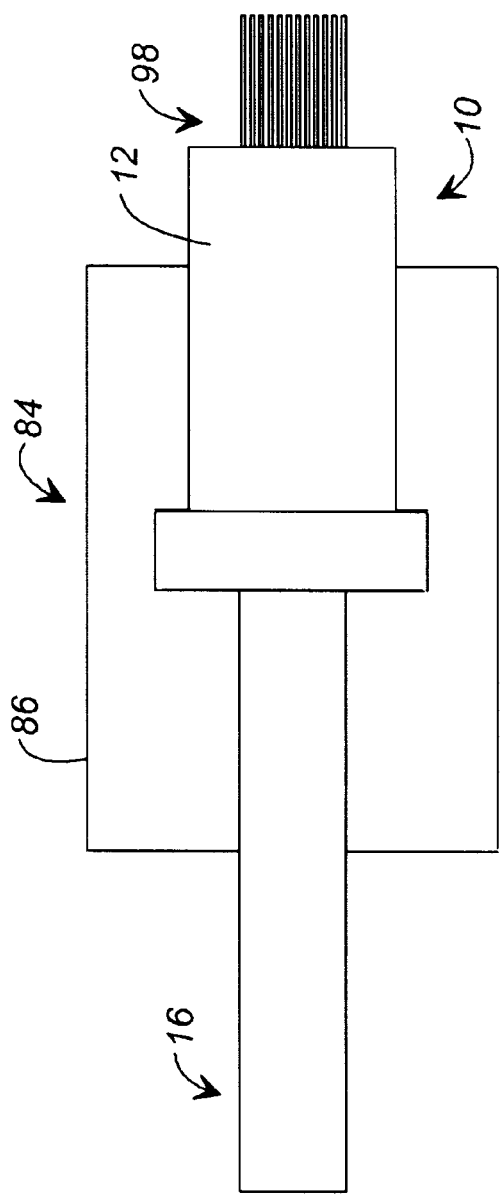
Figure 8G:
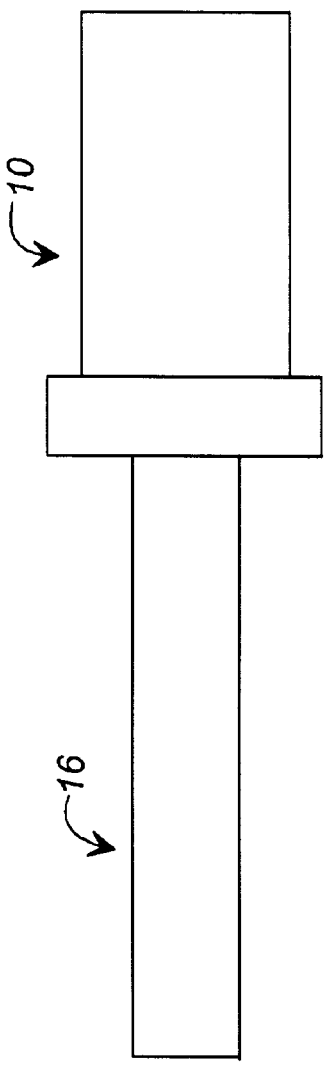
Figure 9A:
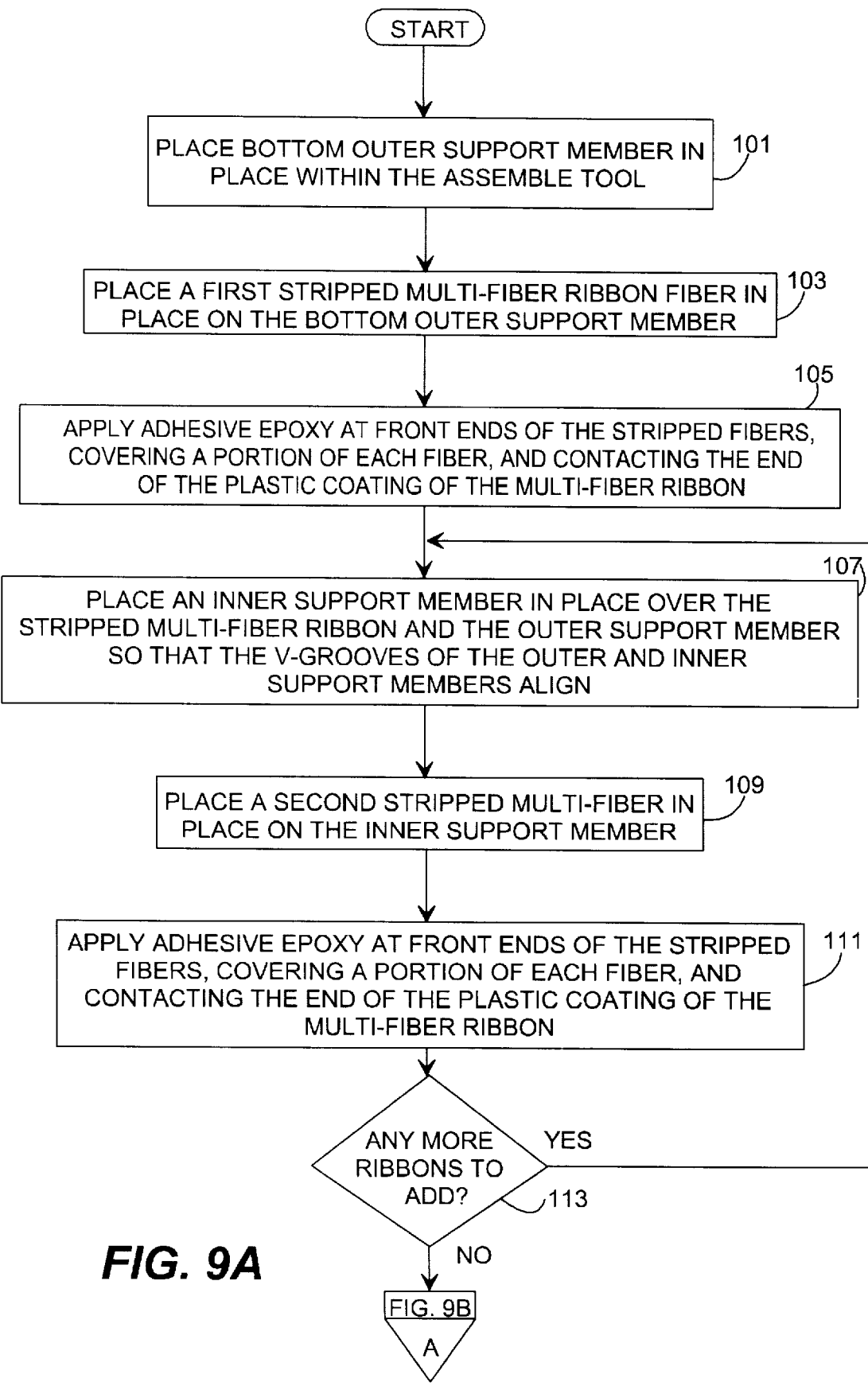

A method and corresponding sequence of events comprising an embodiment of the present invention is provided for by FIGS. 8A–8G and the flowchart of FIGS. 9A and 9B. Initially, the various components, including an assembly tool 84, an outer support member 12, and a multi-fiber ribbon 16, are collected and then prepared. This preparation includes stripping back the coating on the multi-fiber ribbon 16 at an end so as to expose end portions 98 of the individual optical fibers of the multi-fiber ribbon 16, as illustrated in FIG. 8A. While not required, it is preferred that the coating on the fibers be removed because the coatings are not dependably uniform in thickness, that is, the optic fiber may be somewhat off-center with respect to the center of the coated fiber, which may prevent proper alignment to an abutting fiber.

The outer support member 12 is then placed in the support member cavity 92 of the assembly tool 84, as illustrated in FIG. 8B. The multi-fiber ribbon 16 is then placed over the outer support member 12 so that the individual fibers thereof are aligned with the V-grooves 38 of the outer support member 12, as illustrated in FIG. 8C. Note that the end portions 98 of the individual fibers extend past the front-end of the support member 12 so that the front-end of the stack can be polished until the fibers are substantially flush with the front-end of the support members comprising the stack. Thus, the multi-fiber ribbon should be stripped back a length sufficient to ensure that a portion of the ends of the fibers extending past the front-end of the support plate 12 have been stripped.

An adhesive, such as Epotek 353ND, is then applied to the stripped fibers and the coated portion of the multi-fiber ribbon 16 to bond adjacent support members sandwiching the optical fibers to one another so as to securely hold the optical fibers in place.

An inner support member 14 is then placed over the stripped multi-fiber ribbon 16 and the outer support member 12, as illustrated in FIG. 8D. The assembly tool 84 maintains the support members 12 and 14 in precise alignment with respect to one another so that the mating V-grooves of the respective support members are in registration with one another. Thus, each optical fiber is contained by mating V-grooves of the respective support members in precise alignment with regard to one another. This is important in order that the optical fibers are precisely positioned so that they can be efficiently coupled to an abutting optical fiber of a mating ferrule.

The next multi-fiber ribbon 16 can then be added to the stack, as illustrated in FIG. 8E as can successive inner support members in the manner described above. The stack can be built to a desired number of multi-fiber ribbons by repeating the steps above. The last support member placed on the stack is a second outer member 12, as illustrated in FIG. 8F. While in the assembly tool 84, the multi-fiber ferrule 10 is clamped, preferably at the front portions 34, 54 of the support members 12, 14, that is, the portion of the support members 12, 14 extending outside the support body 86, so that compressive forces are applied to the stack 10, such as by a calibrated clip or vice. Preferably, approximately 10 lbs. force is applied in the embodiment disclosed herein, though the amount of pressure may vary based on the adhesive, the design of the support members, the size of the stack, etc. The multi-fiber ferrule is then removed from the assembly tool 84 and placed in an oven for curing the adhesive. In the present embodiment, the adhesive can be cure at 85° C. for approximately 15 minutes. Once the adhesive has cured, the end portions 98 of the optical fibers are cleaved and the front-end of the multi-fiber ferrule 10 is polished, as illustrated in FIG. 8G.

With reference now to FIG. 9, a illustrative embodiment of the present invention is provided. Initially, the bottom outer support member is placed within the assembly tool 84, as indicated by block 101. A first stripped multi-fiber ribbon fiber is place on the bottom outer support member, as indicated by block 103, and adhesive epoxy is applied to the stripped fibers, preferably covering a portion of each fiber and contacting the end of the plastic coating of the multi-fiber ribbon, as indicated by block 105. Next, an inner support member is placed over the stripped multi-fiber ribbon and the outer support member so that the v-grooves of the outer and inner support members align in precise registration, as indicated by block 107. A second stripped multi-fiber is placed on the inner support member, as indicated by block 109, and adhesive epoxy is applied at front ends of the stripped fibers, preferably covering a portion of each fiber and contacting the end of the plastic coating of the multi-fiber ribbon, as indicated by block 111.

It is then determined at block 113 whether or not there are any more multi-fiber ribbons to add to the stack. If there are more ribbons to add, then the steps of blocks 107–111 are repeated. If not, then a top outer member is placed over the last multi-fiber ribbon and inner member within the assembly tool, as indicated by block 115 of FIG. 9B. A pressure clamp is attached to the front-end of the ferrule stack, and the clamped stack is removed from the assembly tool, as indicated by block 117. At block 119, the epoxy in the stack is cured under heat and pressure. The excess fiber length extending beyond the front-end of the ferrule stack is cleaved and the front-end is polished, if desired, as indicated by block 121.

The assembly tool and associated assembly method of the present invention therefore facilitates the precise alignment of the plurality of inner and outer members that must be assembled to form the multi-fiber ferrule of the present invention. In particular, the assembly tool and associated method allows for the plurality of inner and outer members to be assembled in an efficient and repeatable manner without requiring costly fixtures or procedures.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for assembling a stackable multi-fiber ferrule utilizing an assembly tool having a slot configured to receive a plurality of v-groove support members therein, comprising:

placing a first support member in the slot of the assembly tool;

placing a first stripped multi-fiber ribbon on the first support member so that the individual fibers of the ribbon overlay respective v-grooves of the first support member;

applying an adhesive on the first multi-fiber ribbon; and placing a second support member over the first support member within the slot of the assembly tool so as to sandwich the first multi-fiber ribbon, wherein the individual fibers of the multi-fiber ribbon are held between respective v-grooves of the first and second support members, thereby forming a ferrule stack.

2. The method of claim 1, further comprising the steps of:

placing a second stripped multi-fiber ribbon on the second support member so that the individual fibers of the ribbon overlay respective v-grooves of the second support member;

applying an adhesive on the second multi-fiber ribbon; and placing a third support member over the second support member within the slot of the assembly tool so as to sandwich the second multi-fiber ribbon, wherein the individual fibers of the second stripped multi-fiber ribbon are held between respective v-grooves of the second and third support members.

3. The method of claim 1, further comprising applying compressive pressure to the ferrule stack.

4. The method of claim 3, further comprising applying heat to cure the adhesive.

5. The method of claim 1, further comprising cleaving off any excess length the individual fibers extending past a front-end of the ferrule stack.

6. The method of claim 1, wherein said step of placing the first support ember comprises placing a first outer support member.

7. The method of claim 1, wherein said step of placing the second support ember comprises placing a first inner support member.

8. The method of claim 7, further comprising:

placing a second stripped multi-fiber ribbon on the first inner support member so that the individual fibers of the ribbon overlay respective V-grooves of the first inner support member;

applying an adhesive on the second multi-fiber ribbon;

placing an outer support member over the first inner support member within the slot of the assembly tool so as to sandwich the second multi-fiber ribbon, wherein the individual fibers of the second multi-fiber ribbon are held between respective V-grooves of the first inner support member and the outer support member.

9. The method of claim 1, wherein said step of applying adhesive comprises applying adhesive to each of the individual fibers and a plastic coating of the multi-fiber ribbon.

10. An assembly tool for assembling a stackable multi-fiber ferrule which holds N multi-fiber ribbons between N+1 support members, comprising:

a support body, having a height and length;

a slot defined by and spanning the length of the support body, wherein said slot includes a ribbon cavity having a width approximating that of the multi-fiber ribbon and a support member cavity having a profile approximating that of a support member, and wherein the support member cavity has a widened width portion and a non-widened width portion, and wherein a length of the ribbon cavity is greater than a length of the widened width portion of the support member cavity to align and support the multi-fiber ribbons as the stackable multi-fiber ferrule is assembled.

11. The assembly tool of claim 10, wherein said assembly tool comprises a material selected from a group consisting of ceramic, steel, aluminum and plastic.

12. The assembly tool of claim 10, wherein support member cavity is sized so that a front-end of a support member extends outside said support member cavity.

13. The assembly tool of claim 10, wherein said slot is sized to accommodate a multi-fiber ferrule which holds at least five multi-fiber ribbons.

14. A method for assembling a stackable multi-fiber ferrule utilizing an assembly tool having a slot configured to receive a plurality of v-groove support members therein, comprising:

fabricating a plurality of support members;

providing an assembly tool;

stacking the outer support members and inner support members within the assembly tool which holds the outer and inner support members in registry with one another;

interposing multi-fiber ribbons between adjacent support members during said stacking step, thereby forming a stack; and applying a compressive force to the stack.

15. The method of claim 14, wherein said step of applying compressive force comprises applying compressive force while the stack is positioned in the assembly tool.

16. The method of claim 14, further comprising applying adhesive between adjacent support members during said stacking step, and thereafter heating the stack to cure the adhesive.

17. The method of claim 14, wherein said step of fabricating a plurality of support members comprises injection molding the support members.

18. The method of claim 17, wherein said step of injection molding the support members comprises providing an injection mold fabricated from a monocrystalline master mold form.

19. An assembly tool for disposing N multi-fiber ribbons between N+1 support members, each support member having a front end and a rear end, to assemble a stackable multi-fiber ferrule, comprising:

a substantially rectangular support body having a height and length;

a slot defined by and spanning the length of the support body, wherein the slot includes a support member cavity having a profile approximating that of a support member, and wherein the support member cavity has a widened width portion and a non-widened width portion, and wherein a length of the widened width portion of the support member cavity is less than a length of the non-widened width portion of the support member cavity.

* * * * *

UNITED STATES PATENT AND TRADEMARK OFFICE
CERTIFICATE OF CORRECTION

PATENT NO. : 6,256,448 B1
DATED : July 3, 2001
INVENTOR(S) : Shahid

It is certified that error appears in the above-identified patent and that said Letters Patent is hereby corrected as shown below:

<u>Column 12,</u>
Line 19, after "length" insert -- of --;
Lines 22 and 25, "ember" should read -- member --.

Signed and Sealed this

Twenty-eighth Day of January, 2003

JAMES E. ROGAN
*Director of the United States Patent and Trademark Office*